United States Patent
Scanlon et al.

[19]

[11] Patent Number: 6,129,595

[45] Date of Patent: Oct. 10, 2000

[54] THREE PHASE SUB FEED LUG ACCESSORY

[75] Inventors: James R. Scanlon, South Windsor; Heather Pugliese, Amston, both of Conn.

[73] Assignee: General Electric Company, Schenectady, N.Y.

[21] Appl. No.: 09/291,120

[22] Filed: Apr. 14, 1999

[51] Int. Cl.[7] .................................................... H01R 9/26

[52] U.S. Cl. ........................ 439/716; 439/709; 361/637; 361/639

[58] Field of Search ..................................... 439/532, 709, 439/715, 716; 361/627, 634, 637, 638, 639, 644, 652, 673, 825

[56] References Cited

U.S. PATENT DOCUMENTS

| | | |
|---|---|---|
| 2,914,708 | 11/1959 | Edmunds . |
| 3,128,142 | 4/1964 | Jacobs et al. . |
| 4,167,768 | 9/1979 | Baker et al. ............................. 361/355 |
| 5,107,396 | 4/1992 | Rosen et al. ............................. 361/355 |
| 5,450,282 | 9/1995 | Webber et al. .......................... 361/637 |
| 5,786,982 | 7/1998 | Rose et al. ............................... 361/639 |
| 5,920,456 | 7/1999 | Bozzone et al. ......................... 361/627 |
| 5,973,914 | 10/1999 | Rose et al. ............................... 361/627 |
| 6,036,542 | 3/2000 | Montague et al. ...................... 439/595 |

OTHER PUBLICATIONS

Cutler–Hammer Catalog, Loadcenter Accessories, Jul. 1995, p. AA–34.

*Primary Examiner*—Brian Sircus
*Assistant Examiner*—Thanh-Tam Le
*Attorney, Agent, or Firm*—Cantor Colburn LLP; Carl B. Horton

[57] ABSTRACT

A three phase (3φ) sub feed lug accessory is presented. In an exemplary embodiment the 3φ sub feed lug accessory comprises a 3φ sub feed lug block and a tie down bracket. The 3φ sub feed lug block includes a housing having a first end and a second opposing end. At the first end, at least one and preferably a plurality of openings are formed in the housing, wherein each opening has an interlocking slot extending from the opening. The openings are intended to receive corresponding first tabs extending from one side of a load center and once the first tabs are received, they are releasably interlocked within the interlocking slots of the housing. At the second end of the housing, a shoulder is formed, wherein the shoulder defines a planar platform for receiving a first end of the tie down bracket. Similarly, the tie down bracket includes interlocking slots at a second end which are designed to interlockingly secure the second end of the bracket to second tabs of the load center, with the first end being secured to the 3φ sub feed lug block. The interlocking of the 3φ sub feed lug block and bracket results in the 3φ sub feed lug block being electrically connected to load center bus bars across the load center itself.

25 Claims, 3 Drawing Sheets

THREE PHASE SUB FEED LUG ACCESSORY

BACKGROUND OF THE INVENTION:

This invention relates generally to electrical distribution devices and more specifically relates to a three phase sub feed lug, stab on design, for tapping out of a three phase load center.

Electrical distribution devices are well known in the art and often include a load center. One of the components of the load center is generally one or more electrical bus bars which are secured to and disposed within a housing. The load center functions to distribute electric power and protect wires/devices from a power supply source to power consuming electrical devices, and more specifically, power is distributed from the electrical bus bars to the individual power consuming devices. Many load centers are characterized as being three phase load centers in that typically there are three spaced bus bars, each bus bar corresponding to and carrying one phase of current.

In order to permit power consuming electrical devices to be connected to the bus bar assembly, connecting hardware is used to connect these electrical devices to the bus bar assembly. The connecting hardware permits the electrical devices to be easily attached and removed from the electric bus bar assembly of the load center. One of the more typically used connecting hardware components is a current carrying stab assembly. For example, the current carrying stab assembly may include a plurality of conducting blades, wherein each individual blade has one end which is electrically interconnected to one of the bus bars and an opposite end which extends away from the respective bus bar and is intended to be received within another electrical component to electrically interconnect the component with the bus bar.

Furthermore, it is also known to provide a single 3φ phase tap kit which permits a tap connector to tap into one or more phases of the load center by being mounted onto the load center so that an electrical connection is formed between the tap connector and the corresponding bus bar(s) of the load center. These tap connectors are commonly referred to in the art as a phase sub feed lug accessory. The sub feed lug accessory may comprise a sub feed lug block which taps into one or more phases of the load center. Typically, the sub feed lug block of the prior art is mounted and secured to the load center and electrically interconnected to one or more bus bars by the use of a plurality of fasteners. For example, it is common to mount the sub feed lug block to the load center by securely bolting the sub feed lug block directly to the sides of the load center to form the desired electrical interconnection between the sub feed lug block and one or more bus bars.

One of the associated disadvantages of using the prior sub feed lug accessory is that the commonly used technique to mount the sub feed lug accessory to the load center requires several steps and is time consuming and limits the ease of removing and/or relocating the sub feed lug block on the load center. Subsequent movement or relocation of the sub feed lug block requires the removal of all of the fasteners (e.g., bolts) which are used to mount the sub feed lug block. Thus, this can be a time consuming process and depending upon the location of all of the components, it may de a difficult task. It will be appreciated that a sub feed lug block which is easily mounted to the load center and which permits easy relocation would be desirable in view of the foregoing.

BRIEF SUMMARY OF THE INVENTION

The above-discussed and other drawbacks and deficiencies of the prior art are overcome or alleviated by the sub feed lug accessory of the present invention and the method of releasably interlocking the sub feed lug accessory with a load center containing a plurality of bus bars. The load center preferably includes opposing and parallel first and second sides, each side having a plurality of tabs extending upward therefrom in a direction away from the plurality of bus bars which are disposed between the sides of the load center. The sub feed lug accessory of the present invention is designed to withstand 22 kilo amps interrupting capacity (hereinafter abbreviated as KAIC). This design is provides 22 KAIC withstand rating (UL) without the need for excessive hardware because of the unique bracket/tie down system.

In an exemplary embodiment of the present invention, the sub feed lug accessory is in the form of a three phase (3φ) sub feed lug kit comprising a sub feed lug block and a tie down bracket to secure the 3φ sub feed lug block to a 3φ load center. More specifically, the 3φ sub feed lug block is electrically interconnected to 3φ bus bars disposed within the 3φ load center. The 3φ sub feed lug block includes a housing having a first end and a second opposing end. At the first end, at least one and preferably a plurality of openings are formed in the housing, wherein each opening has an interlocking slot extending from the opening. The openings are intended to receive corresponding first tabs (first rail) of the load center and after the tabs are received, they are releasably interlocked in the interlocking slots of the housing. At the second end of the housing, a shoulder is formed, wherein the shoulder defines a planar platform for receiving a first end of the tie down bracket. The 3φ sub feed lug block further includes a plurality of conductors and lugs, the use of which is known in the art and permits an electrical connection to be formed between the 3φ sub feed lug block and the plurality of bus bars of the load center.

The tie down bracket also includes interlocking slots at one end to receive and interlock with the second tabs on the load center which are opposite the first tabs used to interlock the 3φ sub feed lug block to the load center. Preferably, the other end of the tie down bracket includes openings which may be used to mount the other end to the planar surface of the 3φ sub feed lug block housing. For example, a single fastener may be used to accomplish the mounting between these two components and withstand 22 KAIC.

The 3φ sub feed lug block is conveniently, easily, and interlockingly mounted to the load center by interlocking the tie down bracket with the second tabs (second rail) of the load center. The second tabs are received and interlock with the interlocking slots formed in the one end of the tie down bracket. Similarly, the 3φ sub feed lug block is interlocked with the first tabs of the load center by receiving the first in the openings formed in the block housing and then sliding the 3φ sub feed lug block so that the first tabs are interlockingly retained in the interlocking slots of the housing. Once this end of the 3φ sub feed lug block is retained at the one side, the 3φ sub feed lug block is moved toward the bus bars to form an electrical connection between the 3φ sub feed lug block and the bus bars. Typically, this electrical connection is formed via the use of a stab assembly which comprises stab blades extending from the bus bars and a corresponding connector formed within the 3φ sub feed lug block which electrically connects to the stab blades.

After the stab blades are electrically connected to the 3φ sub feed lug block and the block extends across the bus bars, the other end of the tie down bracket is disposed on the planar surface at the second end of the 3φ sub feed lug block. The tie down bracket is secured to the 3φ sub feed lug block by known methods including the using a fastener which is disposed through the opening in the one end of the bracket and an opening formed in the planar surface. Accordingly, the present invention offers a low cost, easy sub feed lug accessory which is interlockingly secured to the load center using a minimum number of fasteners and can withstand 22 KAIC. The exemplary embodiment including "T shaped" slots in the tie down bracket offers stability and permits the desired withstand level. In a preferred embodiment, only a single fastener is used to secure both the 3φ sub feed lug block and the tie down bracket to the load center. Consequently, the sub feed lug accessory may be easily relocated along the load center without having to perform time consuming and difficult steps.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
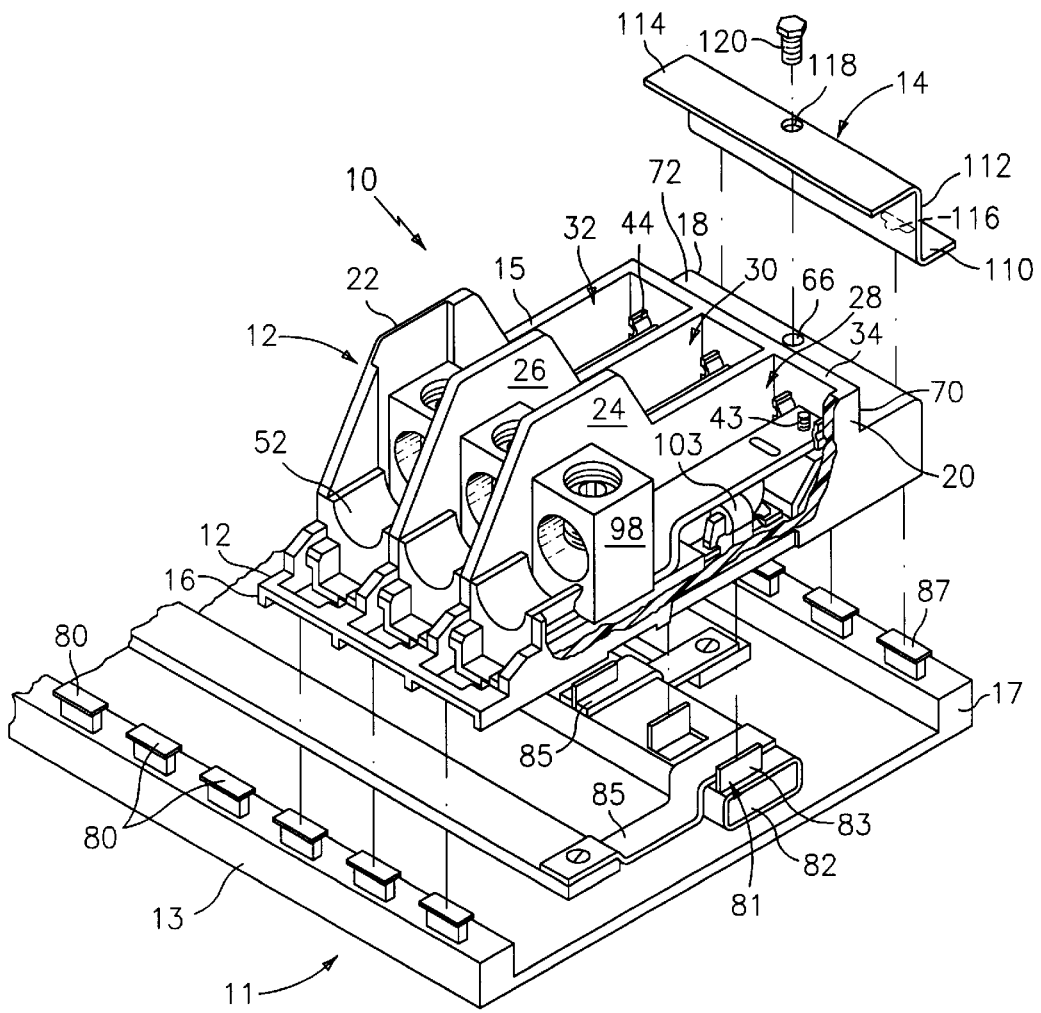
FIG. 1 is an exploded perspective view of a first embodiment of a sub feed lug accessory embodying the present invention.
Figure 2:
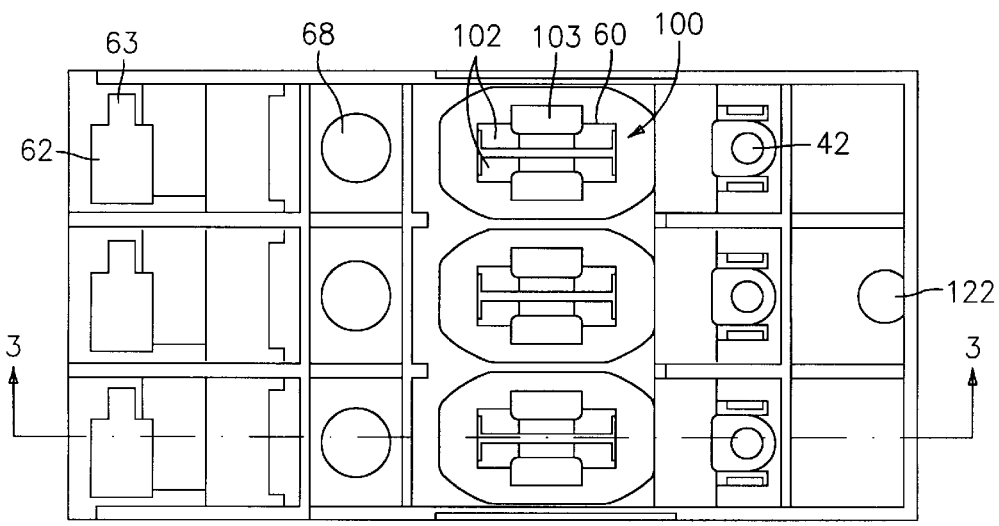
FIG. 2 is bottom plan view of the sub feed lug accessory of FIG. 3.
Figure 3:
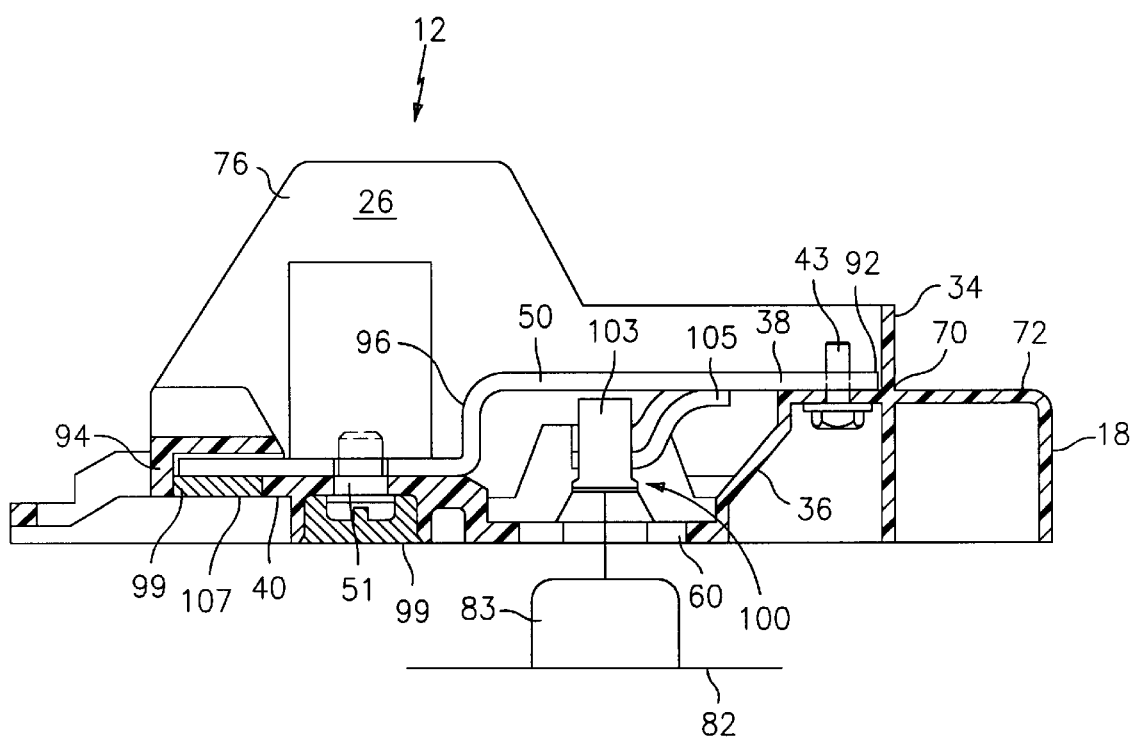
FIG. 3 is a cross sectional view taken substantially along the line 3—3 of FIG. 2.

Turning to FIGS. 1–3. FIG. 1 is an exploded perspective view of a first embodiment of a three phase (3φ) sub feed lug kit 10 suitable for and intended for use with first and second rails 13 and 17 of a load center 11. 3φ sub feed lug kit 10 comprises a 3φ sub feed lug block 12 and a tie down bracket 14. 3φ sub feed lug block 12 includes a housing 15 having a first end 16 and an opposite second end 18. One side of 3φ sub feed lug block 12 includes a first side wall 20 and an opposite side includes a second side wall 22. Formed between first side wall 20 and second side wall 22 and between first end 16 and second end 18 are a plurality of compartments formed within housing 15. More specifically, a pair of intermediate walls 24 and 26 define first, second, and third compartments 28, 30, and 32, respectively. First compartment 28 is defined in part by first side wall 20 and first intermediate wall 24 and second compartment 30 is defined in part by first and second intermediate walls 24 and 26. Similarly, third compartment 32 is defined in part by second intermediate wall 26 and second side wall 22.

Proximate second end 18, first, second, and third compartments 28, 30, and 32 terminate in an intermediate end wall 34 which extends between first and second side walls 20 and 22. Preferably, intermediate end wall 34 is integrally formed with first and second side walls 20 and 22 and with first and second intermediate walls 24 and 26. Each of compartments 28, 30, and 32 include a beveled surface 36 leading up to a planar landing 38 which extends between first and second side walls 20 and 22 and abuts intermediate end wall 34. It being understood that one end of beveled surface 36 intersects a bottom surface 40 of housing 15, while the opposite end of beveled surface 36 intersects landing 38. Formed within landing 38, are a plurality of openings 42 which are intended to receive a fastener 43. The plurality of openings 42 are spaced so that each of compartments 28, 30, and 32 includes a single opening 42. In the exemplary embodiment illustrated in FIG. 1, a pair of flanges 44 extend from landing 38 in each of compartments 28, 30, and 32, wherein one pair of flanges 44 is disposed around a single opening 42 in each of compartments 28, 30, and 32. Each pair of flanges 44 serves to locate a conducting plate 50 as will be described in greater detail hereinafter.

Proximate first end 16, housing 15 includes an arcuate groove 52 which is designed to locate and secure an electrical conductor, e.g., an electrical conductor (not shown) within one or more of compartments 28, 30, and 32. More specifically, each of arcuate grooves 52 comprises an end of each of compartments 28, 30, and 32 which is opposite landing 38. Arcuate grooves 52 are preferably integrally formed with side walls 20 and 22 and intermediate walls 24 and 26. Intermediate beveled surface 36 and arcuate grooves 52 and formed within bottom surface 40 of housing 15 are a plurality of stab openings 60, wherein each of compartments 28, 30, and 32 includes a single stab opening 60. In the exemplary embodiment illustrated, each stab opening 60 has a generally cruciform cross section. It being understood that it is within the scope of the present invention that stab openings 60 may have a variety of cross sectional shapes. Intermediate arcuate grooves 52 and stab openings 60 are a plurality of lug openings 68 which are formed in bottom surface 40 of housing 15.

First end 16 of housing 15 comprises an interlocking end for releasably retaining housing 15 to load center 11. Interlocking first end 16 comprises at least one and preferably a plurality of rectangular openings 62, wherein each opening 62 includes an interlocking slot 63 extending from one side of opening 62. Each interlocking slot 63 is generally perpendicular to the side of opening 62 from which interlocking slot 63 extends and each interlocking slot 63 is located proximate arcuate grooves 52. The plurality of openings 62 and interlocking slots 63 are integrally formed in housing 15. Each of openings 62 and interlocking slots 63 preferably corresponds to one of compartments 28, 30, and 32.

As best seen in FIGS. 1 and 3, intermediate end wall 34 in part defines a shoulder 70 formed in housing 15 proximate second end 18. Intermediate end wall 34 is generally perpendicular to a first planar surface 72 which intersects and extends from intermediate end wall 34 to second end 18. Formed in first planar surface 72 is an opening 66 which is intended to receive a fastener 120 which interconnects 3φ sub feed lug block 12 and tie down bracket 14 as will be described hereinafter.

3φ sub feed lug kit 10 of the present invention provides an interlocking assembly which easily and securely mounts to load center 11 via openings 62 and interlocking slots 63 which receive and interlock with load center breaker tabs 80 which are formed on first side rail 13 of load center 11. Second side rail 17 preferably includes the same load center breaker tabs 87. The exemplary load center 11 illustrated in FIG. 1 comprises a 3φ load center having a housing which contains a plurality of bus bars 82. As is known, each of bus bars 82 in 3φ load center 11 corresponds to one of three power phases. The plurality of bus bars 82 are intermediate the opposing side rails 13 and 17 of load center 11 where load center breaker tabs 80 and 87, respectively, are located. Typically, load center breaker tabs 80 and 87 extend upward away from rails 13 and 17. Each load center breaker tab 80 on first side rail 13 corresponds and is preferably axially aligned with another tab 87 on the opposite second side rail 17. Load center 11 also includes a stab assembly 81 having a plurality of blades 83. Each blade 83 has one end which is electrically connected to one of bus bars 82 and an opposite end extending away from the plurality of bus bars 82. This opposite end is designed to be received within an electrical component to electrically interconnect the component with the plurality of bus bars 82. In the exemplary load center 11 illustrated, the plurality of blades 83 is centrally located in load center 11; however, it is within the scope of the present invention that the plurality of blades 83 may be located in other locations in load center 11. When the plurality of blades 83 is centrally located on the center bus bar 82, each of blades 83 is electrically connected to only a single bus bar 82. This is accomplished by using a strap assembly 85 which electrically connects a single blade 83 to a side bus bar 82. Each blade 83 which is electrically connected to one of the side bus bars 82 is not electrically connected to the center bus bar 82 to prevent short circuiting of the assembly. Thus, strap assembly 85 electrically connects only a single blade 83 disposed on the center bus bar 82 to one of the side bus bars 82. As is known, the center bus bar 82 may include a plastic insulating strip to prevent unwanted electrical contact between components.

Referring to FIGS. 1–3, 3φ sub feed lug block 12 preferably includes a plurality of conducting plates 50, wherein a single conducting plate 50 is disposed in each of compartments 28, 30, and 32. Each conducting plate 50 has a first end 92 and a second end 94 with first end 92 being generally disposed proximate intermediate end wall 34 and second end 94 being disposed at arcuate groove 52. Conducting plate 50 has a neck down portion 96 forming a shoulder intermediate first and second ends 92 and 94 so that first end 92 lies flush against planar landing 38 and second end 94 lies flush against bottom surface 40. Formed beneath each arcuate groove 52 is a recess 107, wherein second end 94 of conducting plate 50 is received with recess 107. Second end 94 of conducting plate 50 is prevented from moving in a direction away from bottom surface 40 when it is received in recess 107. Recess 107 forms an opening in bottom surface 40 beneath arcuate groove 42 and access to conducting plate 50 from exterior bottom surface 40 is permitted due to this opening. Therefore, to insulate conducting plate 50 from load center 11, an insulating material 99 is around conducting plate 50 in recess 107. Any suitable insulating material 99 may be used and in an exemplary embodiment, insulating material 99 comprises RTV (silicone adhesive). Accordingly, first end 92 is in one plane and second end 94 is in a second plane substantially parallel to the first plane. First end 92 includes an opening which permits a fastener to extend through opening 42 formed in each of compartments 28, 30 and 32 to securely fasten first end 92 to planar landing 38 in a respective compartment 28, 30, or 32.

3φ sub feed block 12 also includes a plurality of lugs 98, wherein a single lug 98 is disposed in each of compartments 28, 30, and 32. In an exemplary embodiment, lug 98 is a cube-like structure where one side of lug 98 is disposed on conducting plate 50 proximate second end 94 and arcuate groove 54. It being understood that the shape of lug 98 is not critical to the practice of the present invention. Lug 98 is secured within each of compartments 28, 30, and 32 by mounting lug 98 to conducting plate 50 via a fastener 51 which extends through lug opening 68 and an opening formed in lug 98 to secure the two to bottom surface 40 of housing 15. Insulating material 99 is also disposed around one end of fastener 51 to prevent fastener 51 from making any contact with load center 11 and more specifically with bus bars 82. As is known, lug 98 includes a side bore to permit the electrical conductor, e.g., electrical cable, to extend into and be secured within lug 98. A threaded bore in the top surface of lug 98 receives a threaded fastener (e.g., self tapping screw) which secures the electrical conductor within lug 98 by threading the fastener within the bore and contacting the electrical conductor disposed within arcuate groove 52 and extending in the side bore. The side bore is aligned with arcuate groove 52 to permit the electrical conductor to have easy access to the bored center portion of lug 98.

Also included in 3φ sub feed lug block 12 is a plurality of stab connectors 100, wherein a single stab connector 100 is disposed in each of stab openings 60 within each of compartments 28, 30, and 32. Each stab connector 100 comprises a pair of conducting plates 102 spaced apart and facing one another, wherein a spring loaded C-clamp 103 retains conducting plates 102 in their proper position. The forces generated by spring loaded C-clamp 103 permits an individual blade 83 of stab assembly 81 to be securely and releasably retained between conducting plates 102. An electrical connection is formed between each stab connector 100 and the corresponding conducting plate 90 in one of compartments 28, 30, and 32 by use of a braided cable 105. One end of braided cable 105 is connected to conducting plate 50 and the other end of braided cable 105 is connected to C-clamp 103. Because stab connector 100 is electrically connected to conducting plate 90, an electrical connection with the plurality of bus bars 82 is easily formed by disposing blade 83 of stab assembly 81 between conducting plates 102.

Side walls 20 and 22 and intermediate walls 24 and 26 each include a portion 76 which extends upward away from bottom surface 40 to a height greater than the height of lugs 98 when lugs 98 are mounted to conducting plates 50. Portion 76 serves to electrically isolate lugs 98 from one another to provide added safety benefit by isolating each of the three phases of load center 11 in a separate compartment within 3φ sub feed lug block 12. Housing 15 of sub feed lug block 12 may be formed of any suitable material and in a preferred embodiment is formed of a plastic.

Referring to FIG. 1, which illustrates tie down bracket 14. Tie down bracket 14 is preferably an integral structure having a first surface 110, a second surface 112 and a third surface 114. First surface 110 is disposed in a first plane and third surface 114 is disposed in a second plane which is substantially parallel to the first plane. Second surface 112 is disposed at a 90° angle relative to both first surface 110 and third surface 114. In other words, second surface 112 comprises a step-down portion (shoulder) of tie down bracket 14. Formed in first surface 1 10 are a plurality of interlocking slots 116. In an exemplary embodiment, there are three interlocking slots 116 formed in first surface 110. In the exemplary embodiment shown, each interlocking slot 116 is generally in the form of a "T". This shape provides tie down bracket 14 with stability during use. Formed in third surface 114 is at least one opening 118. In an exemplary embodiment, there are three openings 118 formed in third surface 114 with each opening preferably being in the shape of a circle. Tie down bracket 14 may be formed of any suitable material, including metal, and in an exemplary embodiment, tie down bracket 14 is formed of galvanized steel.

To conveniently and easily install 3φ sub feed lug kit 10 onto load center 11, tie down bracket 14 is positioned in relation to load center breaker tabs 87 so that the plurality of interlocking slots 116 formed in first surface 110 engage and interlock with load center breaker tabs 87 by disposing tabs 87 within the opening of interlocking slot 116. Tie down bracket 14 interlocks with second side rail 17 of load center 11 by interlocking load center breaker tabs 87 with the plurality of interlocking slots 116 as tie down bracket 14 is slid in a direction away from second end 18 to engage tabs 87. In a similar manner, 3φ sub feed lug block 12 interlocks with load center 11 via openings 62 and interlocking slots 63 formed in 3φ sub feed lug block 12 with load center breaker tabs 80 located on first side rail 13 of load center 11 opposite second side rail 17 in which tie down bracket 14 is disposed. To securely interlock first end 16 of 3φ sub feed lug block 12 with load center breaker tabs 80, each tab 80 is received in opening 62 at first end 16 and 3φ sub feed lug block 12 is slid relative to load center breaker tabs 80 so that tabs 80 are received in interlocking slot 63 resulting in an interlocking action between 3φ sub feed lug block 12 and load center 11.

Once first end 16 is locked downward onto load center breaker tabs 80, second end 18 is raised upward away from load center 11 to permit positioning of tie down bracket 14 relative to 3φ sub feed lug block 12. Tie down bracket 14 is positioned so that third surface 114 is raised in a direction away from load center 11 so that second end 18 may be lowered onto the plurality of bus bars 82 of load center 11. In other words, the portion of tie down bracket 14 (third surface 114) which is not interlocked with load center breaker tabs 87 is raised to permit second end 18 to be lowered into proper position across load center 11 without obstruction by tie down bracket 14. As 3φ sub feed lug block 12 is lowered downward toward load center 11, stab connectors 100 engage corresponding blades 83 of stab assembly 81 of load center 11 to provide an electrical connection between the plurality of bus bars 82 and 3φ sub feed lug block 12. Each blade 83 frictionally engages conducting plates 102 of one stab connector 100 and the spring loaded mechanism of C-clamp 103 applies a biasing force to securely retain blade 83 between conducting plates 102 resulting in an electrical connection being formed therebetween.

In the exemplary embodiment illustrated in FIG. 1, blades 83 of stab assembly 81 are centrally located in load center 11 and extend away from the plurality of bus bars 82. As is known, each bus bar 82 corresponding to a single phase is connected to a single blade 83 of stab assembly 81 so permit a direct electrical connection to bus bar 82 of load center 11. As blades 83 are disposed between conducting plates 102 by lowering 3φ sub feed lug block 12 toward the plurality of bus bars 82, it is intended that 3φ sub feed lug block 12 be lowered into position across the plurality of bus bars 82 with second end 18 being interlocked to load center breaker tabs 80 via openings 62 and interlocking slots 63. Tie down bracket 14 is then mounted to 3φ sub feed lug block 12 by positioning third surface 114 flush against first planar surface 72 of 3φ sub feed lug block 12. Opening 66 formed in first planar surface 72 is aligned with opening 118, preferably the center opening 118 and tie down bracket 14 is securely mounted to 3φ sub feed lug block 12 by disposing fastener 120, e.g., screw, through openings 66 and 118. Fastener 120 is received in a boss 122 formed in housing 15 at second end 18.

It being understood that the load center breaker tabs 87 used to interlock tie down bracket 14 and the load center breaker tabs 80 used to interlock 3φ sub feed lug block 12 are disposed across from one another and are each preferably axially aligned with one another so that when 3φ sub feed lug kit 10 is installed onto load center 11, first and second ends 16 and 18 of 3φ sub feed lug block 12 lie substantially parallel to side rails 13 and 17 of load center 11. Accordingly, 3φ sub feed lug block 12 lies across the plurality of bus bars 82 included in load center 11.

3φ sub feed lug kit 10 of the present invention is designed to withstand 22 KAIC during use on load center 11. The present design is capable of providing 22 KAIC withstand because of its unique interlocking design. One end of 3φ sub feed lug block 12 provides an interlock corresponding to the rail design 13 of load center 11 and provides a hold down for 3φ sub feed lug block 12 to rails 13 and 17 of load center 11 and more specifically to load center breaker tabs 80 and 87, respectively. In order to realize withstand levels of 22 KAIC so tie down bracket 14 is designed so that these withstand levels are realized. Tie down bracket 14 interlocks with load center 11 and the two interlocking designs (3φ sub feed lug block 12 and tie down bracket 14) together provide the 22 KAIC withstand rating (UL). Thus, 3φ sub feed lug kit 10 of the present invention offers a convenient and easy stab on connector which allows a tap from existing 3φ load center 11 and provides the ability for a daisy chain feed adjacent 3φ load center 11.

Figure 4:
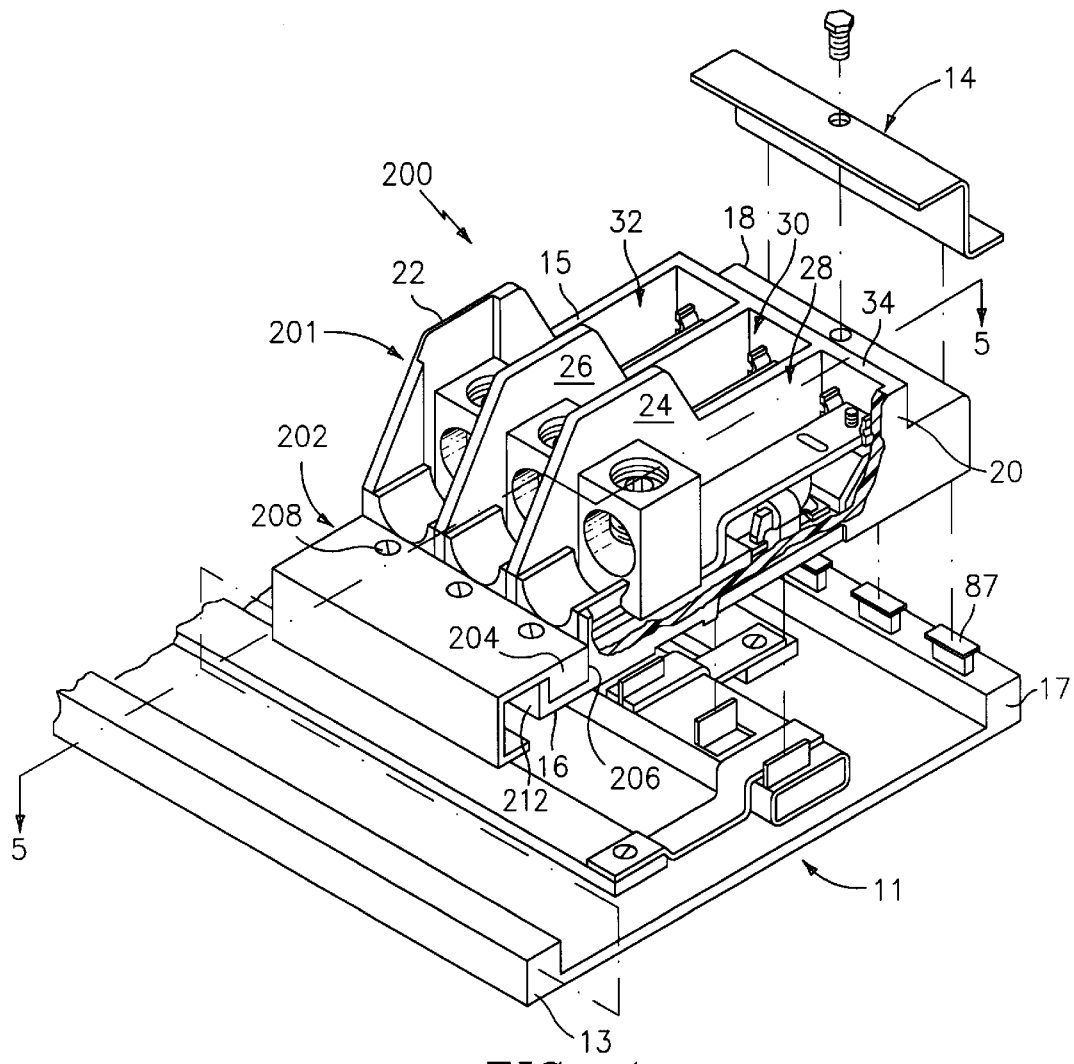
FIG. 4 is an exploded perspective view of a second embodiment of a sub feed lug accessory embodying the present invention.
Figure 5:
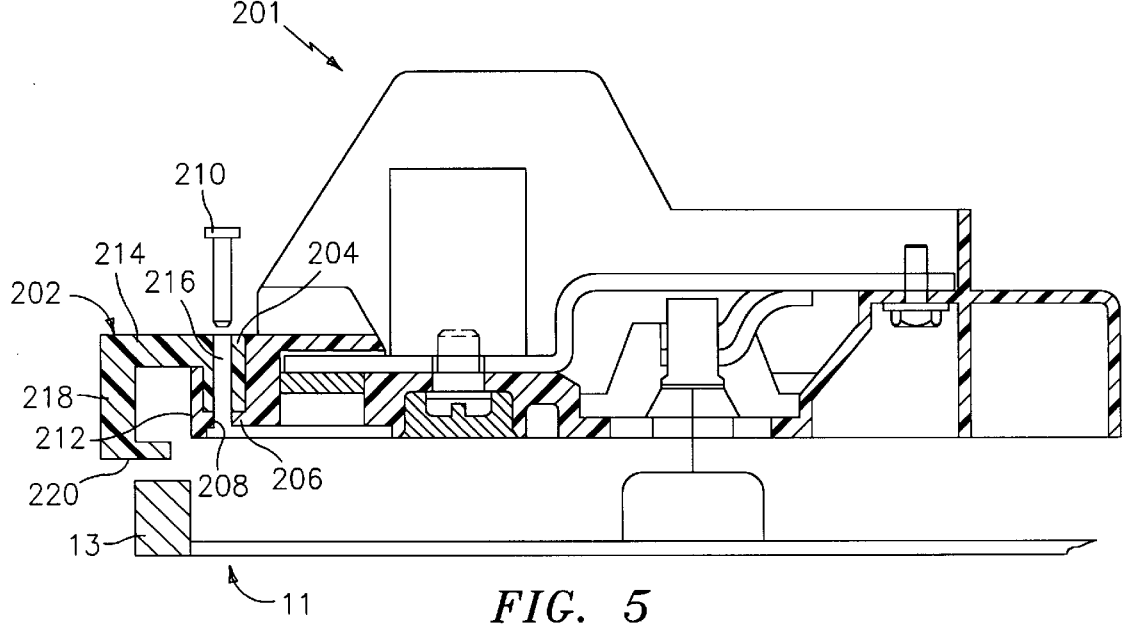
FIG. 5 is cross sectional view taken substantially along the line 5—5 of FIG. 4.

Turning now to FIGS. 4–5 which illustrate a second embodiment of a 3φ sub feed lug kit 200 of the present invention. 3φ sub feed lug kit 200 is similar to 3φ sub feed lug kit 10 with like elements being numbered alike. In this second embodiment, 3φ sub feed lug block 201 comprises a two piece design. More specifically, first end 16 of housing 15 still secures housing to preferably one rail 13 of load center 11; however, first end 16 no longer comprises an interlocking end having a plurality of rectangular openings 62 including interlocking slots 63. As best seen in FIG. 5, first end 16 comprises a separate retaining member 202 which is complementary to and is secured to 3φ sub feed lug block 201. Retaining member 202 is preferably an integral piece having a first end segment 204 which is received in a complementary recess 206 formed in 3φ sub feed lug block 201. Recess 206 includes at least one and preferably three openings 208 which receive a fastener 210 for securing first end segment 204 to 3φ sub feed lug block 201. Recess 206 is formed in part by an outer wall 212 which acts as a stop and prevents first end segment 204 from moving in a direction away from lugs 98.

First end segment 204 integrally connects to one end of an upper wall 214 which is substantially perpendicular to first end segment 204. Upper wall 214 includes at least one and preferably three openings 216 which are intended to axially align with openings 208 when first end segment 204 is received and secured within recess 206, wherein openings 216 receive fastener 210. At an opposite end, upper wall 214 integrally connects to an end wall 218 which is substantially perpendicular to upper wall 214 and substantially parallel to first end segment 204. Extending from end wall 218 is shaped flange 220 which receives one rail 13 of load center 11. Flange 220 includes end lip 224 which engages and locates rail 13 during positioning of 3φ sub feed lug block 201 with respect to load center 11.

Accordingly, to conveniently install 3φ sub feed lug kit 200 onto load center 11, tie down bracket 14 is preferably first positioned with load center breaker tabs 80 has previously described hereinbefore with reference to the first embodiment of FIGS. 1–3. 3φ sub feed lug block 201 is secured to rail 13 by capturing rail 13 within catch segment 220 so that rail 13 is securely positioned between outer wall 212 and end wall 218. First end segment 204 is securely coupled to 3φ sub feed lug block 201 by being received within complementary recess 206. Accordingly, retaining member 202 is secured to 3φ sub feed lug block 201 by use of fasteners 210 which are received through openings 208 and 216.

Once retaining member 202 is secured to 3φ sub feed lug block 201 so that first end 16 is locked to rail 13, second end 18 is positioned and interlocking secured to load center breaker tabs 87 as previously described hereinbefore. In this second embodiment, 3φ sub feed lug kit 200 offers a device which provides 22 KAIC withstand rating (UL) because both ends are designed to be securely coupled to load center 11 and thus overcome the associated disadvantage of the prior art, namely the lower withstand levels and the tendency for the devices to disengage from the load center at higher amperage readings. It is also with scope of the present invention that flange 220 may capture one of bus bars 82, wherein first end 16 of 3φ sub feed lug block 201 is securely coupled to load center 11 via this connection.

One of skill in the art would further appreciate that load center breaker tabs 80 and openings 62 with interlocking slots 63 may be reversed so that end 16 of 3φ sub feed lug block 12 includes protruding tabs 80 which are received in complementary openings 62 and interlocking slots 63 formed in the rail of load center 11. The same may be true for tie down bracket 14, in that tie down bracket 14 may include protruding tabs 87 that interlock with interlocking slots 116 formed in the opposing rail 13 of load center 11. Thus, 3φ sub feed lug block 12 is still releasably interlocked with load center 11. It is also within the scope of the present invention that other releasable methods may be used to interlock both ends 14 and 16 to the rail of load center 11, including snap fitting members.

While preferred embodiments have been shown and described, various modifications and substitutions may be made thereto without departing from the spirit and scope of the present invention. Accordingly, it is to be understood that the present invention has been described by way of illustrations and not limitation.

What is claimed is:

1. A sub feed lug accessory to be electrically connected to a load center having opposing first and second side rails and at least one bus bar disposed therebetween, wherein a first tab extends from the first side rail and a second tab extends from second side rail, the sub feed lug accessory comprising:
   a bracket having a first end and a second end, the second end having at least one interlocking slot for receiving and interlockingly retaining the first tab of the load center;
   a housing having a first end and an opposing second end, the first end having at least one opening with an interlocking slot extending from the opening, wherein the second tab of the load center is received in the at least one opening and is interlockingly retained within the interlocking slot, the second end of the housing receiving the first end of the bracket;
   at least one conductor disposed within the housing, the at least one conductor having a first end and a second end, wherein the first end is electrically connected to the bus bar; and
   at least one lug disposed within the housing, the lug being electrically connected to the second end of the at least one conductor.

2. The sub feed lug accessory as set forth in claim 1, further comprising:
   at least one stab connector for electrically connecting the at least one conductor to the at least one bus bar, the at least one stab connector being electrically connected to the at least one conductor in the housing.

3. The sub feed lug accessory as set forth in claim 2, wherein the at least one stab connector comprises a pair of opposing conductor plates which are biased against one another by a spring biased clamp, wherein a blade extending from the at least one bus bar is received between the opposing conductor plates to electrically connect the at least one conductor to the at least one bus bar.

4. The sub feed lug accessory as set forth in claim 3, further comprising:
   at least one stab opening to permit the blade to be received between the pair of opposing conductor plates, the at least one stab connector being disposed adjacent the stab opening.

5. The sub feed lug accessory as set forth in claim 2, further comprising:
   a braided conductor having a first end electrically connected to the at least one conductor and a second end electrically connected to the at least one stab connector.

6. The sub feed lug accessory as set forth in claim 1, wherein the at least one opening with an interlocking slot comprises three openings, each having a corresponding interlocking slot extending therefrom for receiving and interlocking three second tabs of the load center.

7. The sub feed lug accessory as set forth in claim 1, wherein the at least one conductor comprises three conductors disposed within the housing, the three conductors corresponding to one of three phases of the load center, the load center including three bus bars, each bus bar corresponding to one of the three phases.

8. The sub feed lug accessory as set forth in claim 7, wherein the housing includes a pair of opposing side walls and two inner walls disposed intermediate the pair of opposing side walls, wherein the side walls and inner walls define three compartments in the housing, each compartment having one of the three conductors disposed therein so that the three conductors are electrically isolated from each other by the inner walls.

9. The sub feed accessory as set forth in claim 1, wherein the interlocking slot of the bracket is generally T-shaped.

10. The sub feed accessory as set forth in claim 1, wherein the first end of the bracket includes at least one opening to receive a fastener for mounting the first end of the bracket to the planar surface of the housing.

11. The sub feed accessory as set forth in claim 1, wherein the opening formed in the housing at the first end is rectangular shaped.

12. The sub feed accessory as set forth in claim 1, wherein the accessory has a 22 KAIC withstand rating.

13. A load center having a sub feed lug accessory mounted thereto, comprising:
   a load center housing having a first side rail and an opposing second side rail,
   a plurality of bus bars disposed between the first and second side rails;
   a plurality of first tabs formed at the first side rail, the first tabs extending from the first side rail;
   a plurality of second tabs formed at the second side rail the second tabs extending from the second side rail;
   the sub feed lug accessory comprising:
   a bracket having a first end and a second end, the second end having a plurality of bracket interlocking slots for receiving and interlockingly retaining the first tabs of the load center; and
   a sub feed lug block releasably and interlockingly mounted between the first and second side rails of the load center housing, the sub feed lug block including a block housing having a first end and an opposing second end, the second end having a plurality of openings formed in the housing, each opening having an interlocking slot extending therefrom, wherein each opening receives one of the first tabs for interlockingly retaining the first tab within the interlocking slot, the second end of the block housing for receiving the first end of the bracket;

at least one conductor disposed within the housing, the at least one conductor having a first end and a second end, wherein the first end is electrically connected to one of the plurality of bus bars; and at least one lug disposed within the housing, the lug being electrically connected to the second end of the at least one conductor.

14. The load center as set forth in claim 13, further comprising:

at least one stab connector for electrically connecting the at least one conductor to one of the plurality of bus bars, the stab connector being electrically connected to the at least one conductor in the housing.

15. The load center as set forth in claim 14, wherein the at least one stab connector comprises a pair of opposing conductor plates which are biased against one another by a spring biased clamp, wherein a blade extending from the bus bar is received between the opposing conductor plates to electrically connect the at least one conductor to one of the plurality of bus bar.

16. The load center as set forth in claim 15, wherein the housing includes at least one stab opening to permit the blade to be received between the pair of opposing conductor plates, the at least one stab connector being disposed adjacent the at least one stab opening.

17. The load center as set forth in claim 13, further comprising:

a braided conductor having a first end electrically connected to the at least one conductor and a second end electrically connected to the at least one stab connector.

18. The load center as set forth in claim 13, wherein the at least one conductor comprises three conductors disposed within the housing, the three conductors corresponding to one of three phases of the load center, wherein the plurality of bus bars comprises three bus bars, each bus bar corresponding to one of the three phases.

19. The load center as set forth in claim 18, wherein the block housing includes:

a pair of opposing side walls and two inner walls disposed intermediate the pair of opposing side walls, wherein the side walls and inner walls define three compartments in the housing, each compartment having one of the three conductors disposed therein so that the three conductors are electrically isolated from each other by the inner walls.

20. The load center as set forth in claim 13, wherein the interlocking slot of the bracket is generally T-shaped.

21. The sub feed accessory as set forth in claim 13, wherein the first end of the bracket includes at least one opening to receive a fastener for mounting the first end of the bracket to a planar surface of the housing.

22. The load center as set forth in claim 13, wherein the plurality of openings formed in the block housing at the first end are rectangular shaped.

23. A sub feed lug accessory to be electrically connected to a load center having opposing first and second side rails and at least one bus bar disposed therebetween, comprising:

a bracket having a first end and a second end, the second end having a first means for releasably interlocking with the first side rail of the load center;

a housing having a first end and an opposing second end, the first end having a second means which is complementary to the first means and which releasably interlocks the second side rail of the load center;

at least one conductor disposed within the housing, the at least one conductor having a first end and a second end, wherein the first end is electrically connected to the at least one bus bar; and at least one lug disposed within the housing, the lug being electrically connected to the second end of the at least one conductor.

24. The sub feed accessory as set forth in claim 23, wherein the first means comprises at least one interlocking slot for receiving and interlockingly retaining a first tab extending from the first side rail of the load center.

25. The sub feed accessory as set forth in claim 23, wherein the second means comprises at least one opening with an interlocking slot extending away from the opening for receiving a second tab extending from the second side rail of the load center.

* * * * *